(12) United States Patent
Husemann et al.

(10) Patent No.: US 7,067,581 B2
(45) Date of Patent: *Jun. 27, 2006

(54) REPULPABLE PSAS

(75) Inventors: Marc Husemann, Hamburg (DE); Stephan Zöllner, Hamburg (DE); Andreas Westphal, Hamburg (DE)

(73) Assignee: tesa Aktiengesellschaft, Hamburg (DE)

( * ) Notice: Subject to any disclaimer, the term of this patent is extended or adjusted under 35 U.S.C. 154(b) by 0 days.

This patent is subject to a terminal disclaimer.

(21) Appl. No.: 10/720,828

(22) Filed: Nov. 24, 2003

(65) Prior Publication Data

US 2004/0260030 A1 Dec. 23, 2004

(30) Foreign Application Priority Data

Jun. 17, 2003 (DE) ................. 103 27 198

(51) Int. Cl.
*C08L 31/00* (2006.01)

(52) U.S. Cl. ............ 524/558; 428/40.1; 438/343; 526/317.1; 526/318; 526/319; 526/329.2; 526/346

(58) Field of Classification Search .......... 524/558; 526/317.1, 318, 319, 329.2, 346; 438/343; 428/40.1

See application file for complete search history.

(56) References Cited

U.S. PATENT DOCUMENTS

| 2,838,421 | A |   | 6/1958  | Sohl |
|-----------|---|---|---------|------|
| 3,441,430 | A |   | 4/1969  | Peterson ............... 117/68.5 |
| 3,661,874 | A |   | 5/1972  | Olson ................. 260/83.3 |
| 3,865,770 | A |   | 2/1975  | Blake ................. 260/27 R |
| 4,413,082 | A |   | 11/1983 | Gleichenhagen et al. ... 524/243 |
| 4,595,737 | A |   | 6/1986  | Straub et al. ............. 526/264 |
| 5,084,348 | A |   | 1/1992  | Czech et al. ............. 428/355 |
| 5,314,962 | A | * | 5/1994  | Otsu et al. ............... 525/280 |
| 5,380,779 | A | * | 1/1995  | D'Haese ................. 524/272 |
| 5,489,642 | A |   | 2/1996  | Gleichenhagen et al. ... 524/504 |
| 5,624,751 | A | * | 4/1997  | Spies et al. .......... 428/355 AC |
| 5,767,210 | A |   | 6/1998  | Lecomte et al. ........... 526/166 |
| 5,789,487 | A |   | 8/1998  | Matyjaszewski et al. ... 525/301 |
| 5,811,500 | A |   | 9/1998  | Dubois et al. ............. 526/145 |
| 5,854,364 | A |   | 12/1998 | Senninger et al. .......... 526/192 |
| 5,945,491 | A |   | 8/1999  | Matyjaszewski et al. ... 526/111 |
| 6,106,940 | A |   | 8/2000  | Nielson et al. ............ 428/355 |
| 6,114,482 | A |   | 9/2000  | Senninger et al. .......... 526/172 |
| 6,133,391 | A |   | 10/2000 | Nielson et al. ............ 428/307 |
| 6,402,875 | B1 | * | 6/2002 | Luhmann et al. ........... 156/247 |
| 6,703,441 | B1 | * | 3/2004 | Husemann et al. .......... 524/558 |
| 6,723,407 | B1 | * | 4/2004 | Dollase et al. ............. 428/40.1 |
| 2001/0003617 | A1 |   | 6/2001 | Storbeck et al. ........... 428/355 |
| 2003/0114582 | A1 | * | 6/2003 | Husemann et al. .......... 524/558 |
| 2003/0119970 | A1 |   | 6/2003 | Husemann et al. .......... 524/505 |
| 2003/0143413 | A1 | * | 7/2003 | Storbeck et al. ........... 428/500 |
| 2003/0190467 | A1 |   | 10/2003 | Husemann et al. ......... 428/354 |
| 2004/0006151 | A1 | * | 1/2004 | Husemann et al. ......... 522/134 |
| 2005/0064181 | A1 | * | 3/2005 | Blank et al. ............... 428/354 |

FOREIGN PATENT DOCUMENTS

| DE | 23 60 441    |    | 4/1975  |
|----|--------------|----|---------|
| DE | 31 05 894    | A1 | 10/1982 |
| DE | 34 23 446    | A1 | 1/1986  |
| DE | 39 01 690    | C1 | 3/1990  |
| DE | 199 14 997   | A1 | 10/2000 |
| DE | 199 58 223   |    | 7/2001  |
| DE | 100 36 803   | A1 | 2/2002  |
| DE | 100 36 804   | A1 | 2/2002  |
| DE | 101 53 713   | A1 | 5/2003  |
| DE | 103 14 898   |    | 8/2004  |
| EP | 0 081 846    |    | 6/1983  |
| EP | 0 352 442    |    | 1/1990  |
| EP | 0 824 110    | A1 | 2/1998  |
| EP | 0 824 111    | A1 | 2/1998  |
| EP | 0 860 489    | *  | 2/1998  |
| EP | 0 826 698    | A1 | 3/1998  |
| EP | 0 841 346    | A1 | 5/1998  |
| EP | 0 850 957    | A1 | 7/1998  |
| EP | 1008640      | *  | 6/2000  |
| WO | WO 93/06184  |    | 4/1993  |
| WO | WO 98/01478  |    | 1/1998  |
| WO | WO 99/31144  |    | 6/1999  |
| WO | WO 2004/050781 |  | 6/2004  |

OTHER PUBLICATIONS

U.S. Appl. No. 10/343,185, Husemann et al, filed Jan. 28, 2003.

* cited by examiner

*Primary Examiner*—Bernard Lipman
(74) *Attorney, Agent, or Firm*—Norris McLaughlin & Marcus PA

(57) ABSTRACT

The invention relates to a repulpable pressure-sensitive adhesive. Provision is made for the repulpable pressure-sensitive adhesive to comprise at least one polyacrylate-based block copolymer.

15 Claims, No Drawings

REPULPABLE PSAS

The invention relates to repulpable pressure-sensitive adhesives (PSAs) and also to PSA tapes, labels or other PSA articles equipped with these PSAs and/or formulations thereof. The PSAs described are used with preference in the paper-processing industry as repulpable and recyclable products.

BACKGROUND OF THE INVENTION

In paper processing and for the printing processes it is necessary to splice papers in order to ensure a continuous operation. The splicing operation, and hence the PSA splicing tapes, are subject to very stringent requirements, since even today operating speeds of more than 1 500 m/min are entirely common. PSA splicing tapes must have a good tack, but should also have a high dimensional stability, for exposure to shearing. As well as the adhesive-related requirements, the PSAs ought likewise to withstand the operation of recycling the paper; that is, after reprocessing, there should be no tackiness from the splicing tape remaining on the paper.

Moreover, in recent years, the reprocessing conditions for the paper recycling operation have changed. Formerly, reprocessing was carried out under acid conditions. At the present time the trend is towards reprocessing in a basic medium With the aim of attaining the requirements referred to above, the patent literature has already described a large number of different PSA tapes. The first repulpable splicing tape was described in U.S. Pat. No. 2,838,421. There, polyacrylic acid was mixed with polypropylene glycol to produce a water-soluble PSA. U.S. Pat. No. 3,441,430 describes a repulpable PSA tape based on acrylic acid/ethyl acrylate copolymers and water-soluble plasticizers having at least one ether function.

U.S. Pat. No. 3,661,874 discloses epoxidized rubbers which have been reacted with secondary monoamines and compounded with water-soluble plasticizers. DE 2 360 441 describes copolymers of acrylates and vinylcarboxylic acids which have in part been neutralized with liquid polyoxyethylenes and/or with a reaction product of acidic resins and alkanolamines. The cohesion of these PSAs can be enhanced by using ethoxylated diamines as plasticizers (DE 3 105 894).

The splice strength at relatively high temperatures can be enhanced by using acrylamide (DE 3 901 690 and EP 0,081,846). Terpolymers of N-vinyllactams or N-vinylamides, acrylic acid and alkyl vinyl ethers, disclosed in DE-C 34 23 446, likewise produce an enhancement of splice strength at high temperatures. Acrylic acid can also be substituted by acryloyloxypropanoic acid (EP 0,352,442).

PCT/US 92/06731 discloses terpolymers composed of polar monomers, such as acids or hydroxyalkyl esters, for example, and less polar monomers, such as acrylate-based alkyl esters, for example, and of polymerizable, water-soluble macromonomers. These terpolymers have likewise been blended with water-soluble plasticizers and exhibited high repulpability within a wide pH range.

The polymers cited above, however, possess the disadvantage either that they cause problems in the alkaline reprocessing operation, by forming agglomerates, or that on papers containing calcium carbonate they likewise form agglomerates, which significantly lower the tack of the polymer during adhesive bonding for a prolonged period.

There is therefore a need for a pressure-sensitive adhesive which does not have the aforementioned disadvantages of the prior art.

SUMMARY OF THE INVENTION

The invention accordingly provides a pressure-sensitive adhesive which has a high splice strength and tack over a long period and in basic media.

The repulpable pressure-sensitive adhesive of the invention comprises at least one polyacrylate-based block copolymer. The invention further provides a repulpable pressure-sensitive adhesive tape which is composed of a backing material coated on at least one side with a pressure-sensitive adhesive comprising polyacrylate-based block copolymers.

The block copolymers used in accordance with the invention are characterized by a sequence of "hard and polar" polymer blocks [P(A) or P(A/C)] having a high softening/glass transition temperature and of "soft and less polar" polymer blocks [P(B) or P(B/D)] having a low softening/glass transition temperature, the block copolymers advantageously comprising at least one triblock copolymer structure [P(A)-P(B)-P(A) and/or P(B)-P(A)-P(B), in which in each case P(A) can be substituted by P(A/C) and/or P(B) by P(B/D)]. P(A/C) and P(B/D) denote polymer blocks constructed as a copolymer of A and C and of B and D, respectively.

Some advantageous embodiments which can be used with particular advantage in accordance with the invention are set out by way of example below.

DETAILED DESCRIPTION

As PSAs useful in accordance with the invention it is possible, for example, to make outstanding use of those PSAs based on block copolymers of the general type P(A)-P(B/D)-P(A), in which each block copolymer is composed of a middle copolymer block P(B/D) and two end polymer blocks P(A) where P(B/D) represents a copolymer of the monomers B and D, with P(B/D) possessing a softening/glass transition temperature of from 0° C. to −80° C., component D possessing at least one functional group which is inert in a free-radical polymerization reaction and which serves to increase the cohesion of the block copolymer, P(A) represents a polymer of the monomers A, with P(A) possessing a softening/glass transition temperature of from 20° C. to 175° C. and bearing at least one polar unit, such as a carboxylic acid, hydroxyl, amide, sulphonic acid or phosphoric acid group, for example, the polymer block P(A) is insoluble in the copolymer block P(B/D) and the blocks P(A) and P(B/D) are immiscible.

By softening temperature is meant here a glass transition temperature for amorphous systems and a melting temperature in the case of semi-crystalline polymers. The temperatures indicated here correspond to those obtained from quasi-steady-state experiments, such as DSC, for example.

The cohesion-increasing effect of the copolymer P(B/D) can be brought about advantageously by means of bonds between the individual block copolymers P(A)-P(B/D)-P(A), the functional group of component D of one block copolymer macromolecule interacting with at least one other block copolymer macromolecule. In a particularly advantageous way the functional group of component D brings about the increase in cohesion by means of dipole-dipole interactions and/or hydrogen bonds. With particular preference the functional group of component D is a carboxylic acid group, a hydroxyl group or a tert-butyl group.

As component B it is preferred to use at least one compound of the following general formula

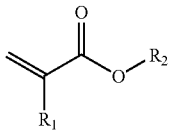

where $R_1$=H or $CH_3$ and $R_2$ is selected from the group of branched and unbranched, saturated alkyl groups having 4–14 carbon atoms.

As component A the monomers are preferably selected such that the resulting polymer blocks P(A) are capable of forming a 2-phase domain structure with the copolymer blocks P(B/D). The fraction of the polymer blocks P(A) is very preferably between 10 and 60% by weight, in particular between 25 and 50% by weight of the overall block copolymer. Additionally, the weight fraction of component D in relation to component B is advantageously between 0 and 30% by weight, in particular between 0.5 and 20% by weight.

Another pressure-sensitive adhesive which can be used outstandingly in the inventive sense is based on block copolymers of the general type P(B)-P(A)-P(B) or of the type P(B/D)-P(A)-P(B/D), each block copolymer being composed of a middle (co)polymer block P(A) and two end (co)polymer blocks P(B) or P(B/D) respectively, where P(B) represents a (co)polymer composed of at least one monomer B, with P(B) possessing a softening/glass transition temperature of 0° C. or lower, or P(B/D) represents a copolymer of the monomers B and D, with P(B/D) possessing a softening/glass transition temperature of 0° C. or lower, component D possessing at least one functional group which is inert in a free-radical polymerization reaction and which serves to increase the cohesion of the block copolymer, P(A) represents a (co)polymer of at least one monomer A, with P(A) having a softening/glass transition temperature of 20° C. or higher and bearing at least one polar unit, such as a carboxylic acid, hydroxyl, amide, sulphonic acid or phosphoric acid group, for example, the (co)polymer block P(A) is insoluble in the (co) polymer block P(B) or P(B/D), and the blocks P(B) and also P(B/D) and P(A) are immiscible.

Component D preferably includes at least one functional group which is inert in a free-radical polymerization reaction and which may serve to increase the cohesion of the block copolymer; in particular by means of bonds between the individual block copolymers, with the functional group of component D of one block copolymer macromolecule interacting with at least one other block copolymer macromolecule; in particular by means of a crosslinking reaction. The functional group for increasing the cohesion can with great advantage be a hydroxyl, a carboxyl, an epoxy, an acid amide, an isocyanato or an amino group, a group comprising a photoinitiator for UV crosslinking, or an unsaturated group.

With further advantage the block P(B) or P(B/D) possesses a softening/glass transition temperature of between −80° C. and 0° C. and/or the block P(A) possesses a softening/glass transition temperature of between 20° C. and 180° C.

The fraction of the (co)polymer blocks P(A) is preferably between 30 and 70% by weight, in particular between 40 and 65% by weight of the overall block copolymer. The weight fraction of component D in relation to component B is advantageously between 0 and 30% by weight, in particular between 0.5 and 20% by weight.

Another pressure-sensitive adhesive which can be used with advantage in accordance with the invention is one based on block copolymers of the general type P(A/C)-P(B)-P(A/C), in which each block copolymer is composed of a middle polymer block P(B) and two end copolymer blocks P(A/C), where P(B) represents a polymer of the monomers B which possesses a softening/glass transition temperature of from 0° C. to −80° C., it being possible for component B to comprise one or more monomers, and where the softening/glass transition temperature of the block P(B) is below 0° C., P(A/C) represents a polymer of at least two monomers A and C, the block P(A/C) possessing a softening/glass transition temperature of from 20° C. to 175° C. and component C being selected from the group of monomers which as homopolymers have a softening/glass transition temperature of more than 60° C. or are capable of UV crosslinking, The polymer block P(B) is insoluble in the copolymer block P(A/C), and the blocks P(B) and P(A/C) are immiscible.

In an advantageous procedure use is made as component C, at least quantitatively, of a compound which raises the softening/glass transition temperature of the copolymer block P(A/C) to $T_G$>20° C. As components A and C it is preferred to select monomers which result in the block P(A/C) being capable of forming a 2-phase domain structure with the copolymer block P(B), in which case A and C may also be identical.

The fraction of the polymer blocks P(A/C) is advantageously between 20 and 70% by weight, in particular between 30 and 65% by weight of the overall block copolymer. With further advantage the weight fraction of component C in relation to component A is between 0 and 30% by weight, in particular between 0.5 and 15% by weight.

With advantage the structure of at least one block copolymer may be described by one or more of the following general formulae:

P(A)-P(B)-P(A)     (I)

P(A)-P(B)-P(A)-P(B)-P(A)     (II)

[P(A)-P(B)]$_n$X     (III)

[P(A)-P(B)]$_n$X[P(B)]$_m$     (IV), where n=3 to 12, m=3 to 12 and X represents a polyfunctional branching region, where the polymer blocks P(A) independently of one another represent homopolymer or copolymer blocks of the monomers A, with the polymer blocks P(A) each having a softening temperature in the range from +20° C. to +175° C. and bearing at least one polar unit, such as a carboxylic acid, hydroxyl, amide, sulphonic acid or phosphoric acid group, for example, and where the polymer blocks P(B) independently of one another represent homopolymer or copolymer blocks of the monomers B, with the polymer blocks P(B) each having a softening temperature in the range from −80° C. to 0° C.

With further advantage at least one block copolymer has a symmetrical structure such that polymer blocks P(A) identical in chain length and/or chemical structure and/or polymer blocks P(B) identical in chain length and/or in chemical structure are present.

It is advantageous if at least one block copolymer meets one or more of the following criteria:
- a molecular weight of $M_n$ of between 25 000 and 600 000 g/mol, preferably between 30 000 and 400 000 g/mol, more preferably between 50 000 and 300 000 g/mol,
- a polydispersity $D=M_w/M_n$ of not more than 3,
- a polymer blocks P(A) fraction between 15 and 70% by weight, preferably between 20 and 60% by weight, in particular between 30 and 55% by weight, based on the triblock copolymer composition,
- one or more grafted-on side chains.

The ratio of the chain lengths of the polymer blocks P(B) to those of the polymer blocks P(A) can in particular be chosen such that the polymer blocks P(A) are present in the form of a disperse phase ("domains") in a continuous matrix of the polymer blocks P(B).

It is additionally possible with advantage to use blends of polyacrylate-based block copolymers as repulpable PSAs. Thus it is possible with outstanding effect to use a polymer blend of two or more block copolymers conforming to the above remarks, and also a blend of one or more block copolymers conforming to the above remarks of at least one diblock copolymer P(A)-P(B), where the polymer blocks P(A) independently of one another represent homopolymer or copolymer blocks of the monomers A, with the polymer blocks P(A) each having a softening/glass transition temperature in the range from +20° C. to +175° C. and bearing at least one polar unit, such as a carboxylic acid, hydroxyl, amide, sulphonic acid or phosphoric acid group, for example, and where the polymer blocks P(B) independently of one another represent homopolymer or copolymer blocks of the monomers B, with the polymer blocks P(B) each having a softening/glass transition temperature in the range from −80° C. to +10° C.

Also outstandingly possible for use in accordance with the concept of the invention is a blend of at least two components K1 and K2, each component being based on at least one block copolymer P1 or P2, respectively, where the at least one block copolymer P1 of component K1 comprises at least the unit P(A1)-P(B1)-P(A1) composed of at least one polymer block P(B1) and at least two polymer blocks P(A1), where P(A1) independently at each occurrence represents homopolymer or copolymer blocks of monomers A1, with the polymer blocks P(A1) each having a softening/glass transition temperature in the range from +20° C. to +175° C. and bearing at least one polar unit, such as a carboxylic acid, hydroxyl, amide, sulphonic acid or phosphoric acid group, for example, P(B1) represents a homopolymer or copolymer block of monomers B1, with the polymer block P(B1) having a softening/glass transition temperature in the range from −80° C. to 0° C., the polymer blocks P(B1) and P(A1) are not homogeneously miscible with one another, where the at least one block copolymer P2 of component K2 comprises at least the unit P(B2)-P(A2)-P(B2) composed of at least two polymer blocks P(B2) and at least one polymer block P(A2), where P(A2) represents a homopolymer or copolymer block of monomers A2, with the polymer block P(A2) having a softening/glass transition temperature in the range from +20° C. to +175° C. and bearing at least one polar unit, such as a carboxylic acid, hydroxyl, amide, sulphonic acid or phosphoric acid group, for example, P(B2) independently at each occurrence represents homopolymer or copolymer blocks of monomers B2, with the polymer blocks P(B2) each having a softening/glass transition temperature in the range from −80° C. to 0° C., the polymer blocks P(B2) and P(A2) are not homogeneously miscible with one another, and where the blend forms an at least two-phase system.

The ratio V of the amount $m_{K2}$ of component K2 used in the blend to the amount $m_{K1}$ of component K1 used in the blend is advantageously up to 250 parts by weight of K2 per 100 parts by weight of K1, i.e. $V=m_{K2}/m_{K1} \leqq 2.5$.

Preferably the blocks P(B1) are compatible with the blocks P(B2) and/or their respectively corresponding polymers P'(B1) with P'(B2) and/or the blocks P(A1) are compatible with the blocks P(A2) and/or their respectively corresponding polymers P'(A1) with P'(A2).

With further advantage the polymer blocks P(B1) and the polymer blocks P(B2) and/or the polymer blocks P(A1) and the polymer blocks P(A2) possess an identical homopolymer and/or copolymer composition.

It is advantageous if the average chain length LA2 of the polymer blocks P(A2) of the block copolymer P2 does not exceed the average chain length LA1 of the polymer block P(A1) of the block copolymer P1; more advantageously LA2 is at least 10% smaller than LA1, very advantageously LA2 is at least 20% smaller than LA1.

It is further of advantage if the polymer blocks P(Au) (i=1, 2, . . . ) are present in the form of a disperse phase ("domains") in a continuous matrix of the polymer blocks P(Bi), preferably in the form of spherical or distortedly spherical domains, this state being obtained in particular by adjusting the ratio $V_{Li}$ of the average chain lengths LAi of the polymer blocks P(Ai) to the average chain lengths LBi of the polymer blocks P(Bi) of the block copolymers Pi, very preferably by adjusting the ratio $V_{L1}$ of the block copolymer P1.

As well as the particularly suitable PSAs above, mention may also be made of those having star structures, corresponding for instance to

[P(A)-P(B)]$_n$X

[P(B)-P(A)]$_n$X

[P(B)-P(A)-P(B)]$_n$X

[P(A)-P(B)-P(A)]$_n$X or, generally,

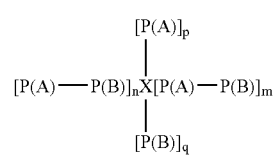

where m and n independently of one another are integers greater than or equal to 1 and at least m or n is greater than or equal to 1; p and q independently are an integer greater than or equal to 0, and X represents a polyfunctional branching unit, i.e. a chemical structural element by way of which two or more polymer arms are linked to one another. It is also possible here for two or more branching units to be present in the polymers. X is generally determined by the polymerization process and can be aliphatic or else aromatic in nature. X may also contain heteroatoms, such as sulphur, for example. Generally speaking, star-shaped polymers can be prepared by means of polyfunctional initiators, or controlled or living block copolymers are reacted with a polyfunctional reactive unit.

Monomers

The monomers A for the copolymer blocks P(A) and/or P(A/C) of the PSAs used in accordance with the invention are preferably selected such that the resulting blocks P(A) and/or P(A/C) are capable of forming a 2-phase domain structure with the copolymer blocks P(B) and/or P(B/D). A prerequisite for this is the immiscibility of the blocks P(B) or P(B/D) with the blocks P(A) or P(A/C), respectively. Within the 2-phase domain structure, regions are formed in which the blocks of different chains (and where appropriate also of identical chains) of one and the same monomer variety mix with one another. These domains, as they are called, are embedded in a matrix of the blocks of the other monomer variety. A characteristic possessed by such a 2-phase domain structure is that of having two softening/glass transition temperatures. With the formation of two phases of different properties, hard volume elements are obtained alongside soft volume elements.

Advantageous examples of compounds used as component A include acrylic acid, itaconic acid, methacrylic acid, hydroxyethyl acrylate, hydroxypropyl acrylate, hydroxyethyl methacrylate, hydroxypropyl methacrylate, acrylamide, vinylphosphonic acid, vinylsulphonic acid and sodium vinylsulphonate.

As component A it is also possible to use zwitterionic monomers, such as the group of the betaines, for example. Examples of suitable betaines include ammonium carboxylates, ammonium phosphates and ammonium sulphonates. Specific examples include N-(3-sulphopropyl)-N-acryloyloxyethyl-N,N-dimethylammonium betaine, 1-(3-sulphopropyl)-2-vinylpyridinium betaine and N-(3-sulphopropyl)-N-allyl-N,N-dimethyl-ammonium betaine. Especially preferred examples are N-(3-sulphopropyl)-N-methacryloyloxyethyl-N,N-dimethylammonium betaine and N-(3-sulphopropyl)-N-acryloyloxyethyl-N,N-dimethylammonium betaine. N-(3-Sulphopropyl)-N-meth-acryloyloxyethyl-N,N-dimethylammonium betaine is available commercially from Raschig AG, Germany. This enumeration makes no claim to completeness.

As monomers B for the copolymer blocks P(B) and/or P(B/D) of the PSAs used in accordance with the invention it is advantageous to use acrylic monomers or vinyl monomers, more preferably those which lower the softening/glass transition temperature of the copolymer block P(B/D)—alone or in combination with monomer D—to below 0° C. Very advantageously for the PSA of the invention use is made as component B of one or more compounds which can be described by the following general formula:

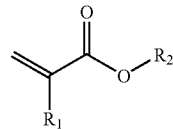

In this formula $R_1$=H or $CH_3$ and the radical $R_2$ is selected from the group of branched and unbranched, saturated alkyl groups having 4 to 14 carbon atoms.

Acrylic monomers which are used with preference for the inventive PSA as component B include acrylic and methacrylic esters with alkyl groups composed of 4 to 18 carbon atoms, preferably 4 to 9 carbon atoms. Specific examples, without wishing to be restricted by this enumeration, include n-butyl acrylate, n-pentyl acrylate, n-hexyl acrylate, n-heptyl acrylate, n-octyl acrylate, n-nonyl acrylate and their branched isomers, such as 2-ethylhexyl acrylate, for example.

Used additionally, optionally, as monomer B are vinyl monomers from the following groups: vinyl esters, vinyl ethers, vinyl halides, vinylidene halides and vinyl compounds having aromatic rings and heterocycles in a position. Here again, mention may be made non-exclusively of certain examples: vinyl acetate, vinyl formamide, ethyl vinyl ether, vinyl chloride, vinylidene chloride and acrylonitrile.

As monomers C it is preferred to use acrylic monomers or vinyl monomers which raise the softening/glass transition temperature of the copolymer block P(A/C)—alone or in combination with monomer A—to above 20° C. In one advantageous version of the process of the invention (meth) acrylic monomers are used, especially those corresponding to the following general formula:

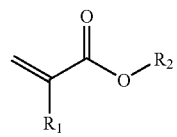

where $R_3$=H or $CH_3$ and the radical $—OR_4$ constitutes or comprises the functional group for increasing the cohesion of the PSA.

Examples of component C include methyl methacrylate, cyclohexyl methacrylate, t-butyl acrylate, allyl alcohol, isobornyl methacrylate, isobornyl acrylate, maleic anhydride, itaconic anhydride, benzoin acrylate, acrylated benzophenone, acrylamides (such as N-t-butylacrylamide, N-isopropylacrylamide and dimethylacrylamide, for example) and. glyceridyl methacrylate, benzyl acrylate, benzyl methacrylate, phenyl acrylate, phenyl methacrylate, t-butylphenyl acrylate, t-butylphenyl methacrylate, 4-biphenylyl acrylate, 2-naphthyl acrylate and 2-naphthyl methacrylate, this enumeration not being conclusive.

Preferred choices here are as follows:
a) for dipole-dipole interaction and/or hydrogen bond formation properties: acrylamides, methyl methacrylate
b) for crosslinking with high-energy radiation: benzoin acrylate, acrylated benzophenone
c) for thermal crosslinking: maleic anhydride, itaconic anhydride, glyceridyl methacrylate, but also all acrylamides.

With t-butyl acrylate an additional increase is produced in the softening/glass transition temperature without an increase in polarity.

As monomers C use is further made of vinylaromatics, which may also be alkylated, functionalized or contain heteroatoms, and which possess $C_4$ to $C_{18}$ aromatic nuclei. Especially preferred examples include styrene, α-methylstyrene, 4-vinylbenzoic acid, sodium 4-vinylbenzenesulphonate, 4-vinylbenzyl alcohol, 2-vinyinaphthalene, 4-vinylphenylboronic acid, 4-vinylpyridine, phenyl vinylsulfonate, 3,4-dimethoxystyrene, vinylbenzotrifluoride, p-methoxystyrene, 4-vinylanisole, 9-vinylanthracene, 1-vinylimidazole, 4-ethoxystyrene and N-vinylphthalimide, this enumeration making no claim to completeness.

Component C may additionally be a UV photoinitiator which is equipped with a copolymerizable vinyl group and which is capable of radiation-chemical crosslinking, in particular of a crosslinking induced by UV irradiation.

Suitable photoinitiators are Norrish I and II photoinitiators. Examples include benzoin acrylate and an acrylated benzophenone from UCB (Ebecryl P 36®). This enumeration is not complete. In principle it is possible to copolymerize any photoinitiators which are known to the person skilled in the art and are able to crosslink the polymer by way of a free-radical mechanism under UV radiation. An overview of possible photoinitiators which can be used, and which may be functionalized with a double bond, is given in Fouassier: "Photoinitiation, Photopolymerization and Photocuring: Fundamentals and Applications", Hanser-Verlag, Munich 1995. Further details can be found in Carroy et al. in "Chemistry and Technology of UV and EB Formulation for Coatings, Inks and Paints", Oldring (ed.), 1994, SITA, London.

As component D use is made in one preferred version of monomers which bear a functional group. The functional group of component D is a group capable of crosslinking reaction through the effect, for example, of thermal energy. With advantage the functional group of component D is chosen to be a hydroxyl, carboxyl, epoxy, acid amid, isocyanato or amino group. Specific examples of monomer D therefore include acrylic acid, hydroxyethyl acrylate, hydroxypropyl acrylate, methacrylic acid, methyl methacrylate, hydroxyethyl methacrylate, hydroxypropyl methacrylate, tert-butyl acrylate, itaconic anhydride, itaconic acid, acrylamides, such as N-tert-butylacrylamide, N-isopropylacrylamide or dimethylacrylamide, for example, and maleic anhydride.

With advantage the functional group of component D that is capable of crosslinking can be an unsaturated group which is capable of radiation-chemical crosslinking, in particular a crosslinking which is induced by means of UV radiation or by irradiation with electron beams. It has been found to be advantageous if the crosslinking-capable functional group of component D is an unsaturated alkyl radical having 3 to 8 carbon atoms which contains at least one C—C double bond.

As monomers for component D it is possible with advantage to use at least one compound of the following general formula

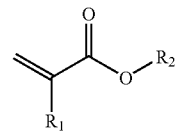

where $R_1$=H or $CH_3$ and —$OR_2$ constitutes or comprises the functional group as above. In this case component D can be chosen such that it lowers the softening/glass transition temperature of the copolymer block P(B/D) to $T_G \leq 0°$ C.

Component D may alternatively be a UV photoinitiator which is equipped with a copolymerizable vinyl group and which is capable of radiation-chemical crosslinking, in particular of a crosslinking induced by UV irradiation.

Suitable photoinitiators are Norrish I and II photoinitiators. Examples include benzoin acrylate and an acrylated benzophenone from UCB (Ebecryl P 36®). This enumeration is not complete. In principle it is possible to copolymerize any photoinitiators which are known to the person skilled in the art and are able to crosslink the polymer by way of a free-radical mechanism under UV radiation. An overview of possible photoinitiators which can be used, and which maybe functionalized with a double bond, is given in Fouassier: "Photoinitiation, Photopolymerization and Photocuring: Fundamentals and Applications", Hanser-Verlag, Munich 1995. Further details can be found in Carroy et al. in "Chemistry and Technology of UV and EB Formulation for Coatings, Inks and Paints", Oldring (ed.), 1994, SITA, London.

Polymerizations

The polymerization can be conducted in accordance with or in modification of a process known per se, in particular by conventional radical polymerization and/or by controlled radical polymerization; the latter is characterized by the presence of suitable control reagents.

For preparing the block copolymers it is possible in principle to use any polymerizations which proceed in accordance with a controlled or living mechanism, and also combinations of different controlled polymerization processes. Here mention may be made, for example, without making any claim to completeness, and in addition to anionic polymerization, of ATRP, nitroxide/TEMPO-controlled polymerization or, more preferably, of the RAFT process; i.e. in particular processes which allow control of the block lengths, of the polymer architecture or else, but not necessarily, of the tacticity of the polymer chain.

Radical polymerizations can be conducted in the presence of an organic solvent or in the presence of water or in mixtures of organic solvents and/or organic solvents with water, or without aqueous or other solvent. It is preferred to use as little solvent as possible. The polymerization time for radical processes, depending on conversion and temperature, is typically between 4 and 72 h.

In the case of solution polymerization the solvents used are preferably esters of saturated carboxylic acids (such as ethyl acetate), aliphatic hydrocarbons (such as n-hexane, n-heptane or cyclohexane), ketones (such as acetone or methyl ethyl ketone), special boiling point spirit, aromatic solvents such as toluene or xylene, or mixtures of aforementioned solvents. For polymerization in aqueous media or in mixtures of organic and aqueous solvents it is preferred to add emulsifiers and/or stabilizers to the polymerization.

Where a radical polymerization method is employed the polymerization initiators used advantageously include customary radical-forming compounds such as peroxides, azo compounds and peroxo sulphates, for example. Initiator mixtures also possess outstanding suitability.

In an advantageous procedure radical stabilization is effected using nitroxides of type (VIIa) or (VIIb):

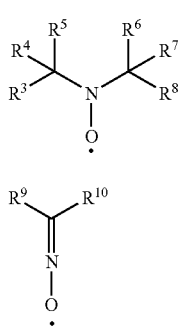

where $R^3$, $R^4$, $R^5$, $R^6$, $R^7$, $R^8$, $R^9$ and $R^{10}$ independently of one another denote the following compounds or atoms:
i) halides, such as chlorine, bromine or iodine,
ii) linear, branched, cyclic and heterocyclic hydrocarbons having 1 to 20 carbon atoms, which can be saturated, unsaturated or aromatic,
iii) esters —COOR", alkoxides —OR$^{12}$ and/or phosphonates —PO(OR$^{13}$)$_2$, in which R", $R^{12}$ and $R^{13}$ stand for radicals from group ii).

Compounds of formula (VIIa) or (VIIb) can also be attached to polymer chains of any kind (primarily in the sense that at least one of the abovementioned radicals constitutes such a polymer chain) and can therefore be used as macroradicals or macroregulators to construct the block copolymers.

More preferred as controlled regulators for the polymerization are compounds of the following type:
2,2,5,5-tetramethyl-1-pyrrolidinyloxyl (PROXYL), 3-carbamoyl-PROXYL, 2,2-dimethyl-4,5-cyclohexyl-PROXYL, 3-oxo-PROXYL, 3-hydroxylimine-PROXYL, 3-aminomethyl-PROXYL, 3-methoxy-PROXYL, 3-t-butyl-PROXYL, 3,4-di-t-butyl-PROXYL;
2,2,6,6-tetramethyl-1-piperidinyloxyl (TEMPO), 4-benzoyloxy-TEMPO, 4-methoxy-TEMPO, 4-chloro-TEMPO, 4-hydroxy-TEMPO, 4-oxo-TEMPO, 4-amino-TEMPO, 2,2,6,6-tetraethyl-1-piperid inyloxyl, 2,2,6-trimethyl-6-ethyl-1 -piperid inyloxyl;
N-tert-butyl 1-phenyl-2-methylpropyl nitroxide;
N-tert-butyl 1-(2-naphthyl)-2-methylpropyl nitroxide;
N-tert-butyl 1-diethylphosphono-2,2-dimethylpropyl nitroxide;
N-tert-butyl 1-dibenzylphosphono-2,2-dimethylpropyl nitroxide;
N-(1-phenyl-2-methylpropyl) 1-diethylphosphono-1-methylethyl nitroxide;
di-t-butyl nitroxide;
diphenyl nitroxide;
t-butyl t-amyl nitroxide.

U.S. Pat. No. 4,581,429 A discloses a controlled-growth radical polymerization process initiated using a compound of the formula R'R"N—O—Y in which Y is a free radical species which is able to polymerize unsaturated monomers. The reactions, however, generally have low conversions. A particular problem is the polymerization of acrylates, which proceeds only to very low yields and molar masses. WO 98/13392 A1 describes open-chain alkoxyamine compounds which have a symmetrical substitution pattern. EP 735 052 A1 discloses a process for preparing thermoplastic elastomers having narrow molar mass distributions. WO 96/24620 A1 describes a polymerization process using very specific radical compounds such as, for example, phosphorus-containing nitroxides which are based on imidazolidine. WO 98/44008 A1 discloses specific nitroxyls based on morpholines, piperazinones and piperazinediones. DE 199 49 352 A1 describes heterocyclic alkoxyamines as regulators in controlled-growth radical polymerizations. Corresponding further developments of the alkoxyamines or of the corresponding free nitroxides enhance the efficiency for preparing polyacrylates (Hawker, Contribution to the National Meeting of the American Chemical Society, Spring 1997; Husemann, Contribution to the IUPAC World Polymer Meeting 1998, Gold Coast).

As a further controlled polymerization method it is possible advantageously to use atom transfer radical polymerization (ATRP) to synthesize block copolymers, with preferably monofunctional or difunctional secondary or tertiary halides being used as initiators and, to abstract the halide(s), complexes of Cu, Ni, Fe, Pd, Pt, Ru, Os, Rh, Co, Ir, Ag or Au (EP 0 824 111 A1; EP 826 698 A1; EP 824 110 A1; EP 841 346 A1; EP 850 957 A1). The different possibilities of ATRP are further described in U.S. Pat. No. 5,945,491 A, U.S. Pat. No. 5,854,364 A and U.S. Pat. No. 5,789,487 A.

It is also possible with advantage to prepare the block copolymer used in accordance with the invention by way of an anionic polymerization. In this case the reaction medium used preferably comprises inert solvents, such as aliphatic and cycloaliphatic hydrocarbons, for example, or else aromatic hydrocarbons.

The living polymer is generally represented by the structure $P_L(A)$-Me, where Me is a metal from group 1, such as lithium, sodium or potassium and $P_L(A)$ is a growing polymer block of the monomers A. The molar mass of the polymer block under preparation is determined by the ratio of initiator concentration to monomer concentration. In order to construct the block structure, first of all the monomers A are added for the construction of a polymer block P(A), then, by adding the monomers B, a polymer block P(B) is attached and subsequently, by again adding monomers A, a further polymer block P(A) is polymerized on, so as to form a triblock copolymer P(A)-P(B)-P(A). Alternatively, P(A)-P(B)-M can be coupled by means of a suitable difunctional compound. In this way it is also possible to obtain starblock copolymers $(P(B)-P(A))_n$. Examples of suitable polymerization initiators include n-propyllithium, n-butyllithium, sec-butyllithium, 2-naphthyllithium, cyclohexyllithium and octyllithium, but this enumeration makes no claim to completeness. Initiators based on samarium complexes are also known for the polymerization of acrylates (Macromolecules, 1995, 28, 7886) and can be used here.

It is also possible, moreover, to use difunctional initiators, such as 1,1,4,4-tetraphenyl-1,4-dilithiobutane or 1,1,4,4-tetraphenyl-1,4-dilithioisobutane, for example. Coinitiators may likewise be employed. Suitable coinitiators include lithium halides, alkali metal alkoxides or alkylaluminium compounds. In one very preferred version the ligands and coinitiators are chosen so that acrylate monomers, such as n-butyl acrylate and 2-ethylhexyl acrylate, for example, can be polymerized directly and do not have to be generated in the polymer by transesterification with the corresponding alcohol.

After the anionic polymerization it is advisable, in order to liberate the polar groups, to carry out a polymer-analogous reaction. One possibility of preparing acrylate block copolymers functionalized with carboxylic acid groups involves the anionic polymerization of tert-butyl acrylate, after which the tert-butyl group can be hydrolysed with trifluoroacetic acid, thereby liberating the carboxylic acid group.

A very preferred preparation process conducted is a variant of the RAFT polymerization (reversible addition-fragmentation chain transfer polymerization). The polymerization process is described in detail, for example, in WO 98/01478 A1 and WO 99/31144 A1. Suitable with particular advantage for the preparation of triblock copolymers are trithiocarbonates of the general structure R'''—S—C(S)—S—R''' (Macromolecules 2000, 33, 243–245), by means of which, in a first step, monomers for the end blocks P(A) are polymerized. Then, in a second step, the middle block P(B) is synthesized. Following the polymerization of the end blocks P(A), the reaction can be terminated and reinitiated. It is also possible to carry out polymerization sequentially without interrupting the reaction. In one very advantageous version, for example, the trithiocarbonates (VIII) and (IX) or the thio compounds (X) and (XI) are used for the polymerization, in which φ can be a phenyl ring, which can be unfunctionalized or functionalized by alkyl or aryl substituents attached directly or via ester or ether bridges, or can be a cyano group, or can be a saturated or unsaturated aliphatic radical. The phenyl ring φ may optionally bear one or more polymer blocks, in accordance with the definition for P(A), P(B), P(A/C) and P(B/D). Examples of possible functionalizations include halogens, hydroxyl groups, epoxide groups, and groups containing nitrogen or sulphur, without this list making any claim to completeness.

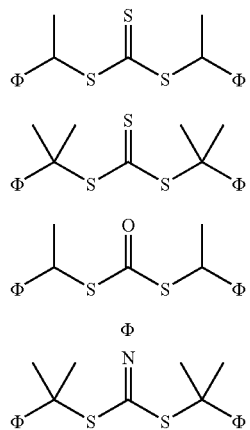

It is also possible to employ thioesters of the general structure $R^{IV}$—C(S)—S—$R^{V}$, particularly in order to prepare asymmetric systems. $R^{IV}$ and $R^{V}$ may be chosen independently of one another: $R^{IV}$ can be a radical from one of the following groups i) to iv) and $R^{V}$ can be a radical from one of the following groups i) to iii):

i) $C_1$ to $C_{18}$ alkyl, $C_2$ to $C_{18}$ alkenyl, $C_2$ to $C_{18}$ alkynyl, each linear or branched; aryl, phenyl, benzyl, aliphatic and aromatic heterocycles;

ii) —NH$_2$, —NH—$R^{VI}$, —NR$^{VI}$R$^{VII}$, —NH—C(O)—$R^{VI}$, —NR$^{VI}$—C(O)—$R^{VII}$, —NH—C(S)—$R^{VI}$, —NR$^{VI}$—C(S)—$R^{VII}$,

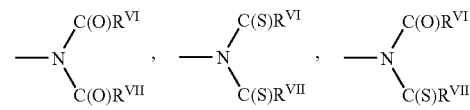

where $R^{VI}$ and $R^{VII}$ are radicals selected independently of one another from group i);

iii) —S—$R^{VIII}$, —S—C(S)—$R^{VIII}$, where $R^{VIII}$ can be a radical from one of groups i) and ii);

iv) —O—$R^{VIII}$, —O—C(O)—$R^{VIII}$, where $R^{VIII}$ can be a radical chosen from one of groups i) and ii).

In connection with the abovementioned polymerizations which proceed by controlled radical mechanisms it is preferred to use initiator systems which further comprise additional radical initiators for the polymerization, especially thermally decomposing radical-forming azo or peroxo initiators. In principle, however, all customary initiators known for acrylates are suitable for this purpose. The production of C-centred radicals is described in Houben-Weyl, Methoden der Organischen Chemie, Vol. E19a, p.60 ff. These methods are employed preferentially. Examples of radical sources are peroxides, hydroperoxides and azo compounds. A few non-exclusive examples of typical radical initiators that may be mentioned here include the following: potassium peroxodisulphate, dibenzoyl peroxide, cumene hydroperoxide, cyclohexanone peroxide, cyclohexyl-sulphonyl acetyl peroxide, di-tert-butyl peroxide, azodiisobutyronitrile, diisopropyl percarbonate, tert-butyl peroctoate and benzpinacol. In one very preferred version the radical initiator used is 1,1'-azobis(cyclohexylnitrile) (Vazo 88®, DuPont®) or 2,2-azobis-(2-methylbutanenitrile) (Vazo 67®, DuPont®). Furthermore, it is also possible to use radical sources which release radicals only under UV irradiation.

In the conventional RAFT process, polymerization is generally carried out only to low conversions (WO 98/01478 A1), in order to obtain very narrow molecular weight distributions. Because of the low conversions, however, these polymers cannot be used as PSAs and particularly not as hotmelt PSAs, since the high residual monomer fraction adversely affects the adhesive performance properties, the residual monomers contaminate the solvent recyclate in the concentration process, and the corresponding self-adhesive tapes would exhibit very high outgassing.

In accordance with the invention the solvent is stripped off, preferably in a concentrating extruder, under reduced pressure; for this purpose it is possible to use, for example, single-screw or twin-screw extruders, which preferentially distil off the solvent in different or the same vacuum stages and which possess a feed preheater.

For further development in accordance with the invention, it is possible to admix tackifier resins to the block copolymer repulpable PSAs. In principle it is possible to use all resins which are soluble in the corresponding polyacrylate blocks P(A), P(B), P(A/C) and P(B/D). Suitable tackifier resins include rosin and rosin derivatives (rosin esters, including rosin derivatives stabilized by, for example, disproportionation or hydrogenation), polyterpene resins, terpene-phenolic resins, alkylphenol resins, and aliphatic, aromatic and aliphatic-aromatic hydrocarbon resins, to name but a few. U.S. Pat. No. 09/040,024, U.S. Pat. No. 6,133,391, U.S. Pat. No. 5,489,642 and U.S. Pat. No. 4,413,082 cite or specify further resins and plasticizers suitable in particular for repulpable PSAs.

Primarily, the resins chosen are those which are preferably compatible with the elastomer block. The weight fraction of the resins in the block copolymer is typically up to 60% by weight, more preferably up to 50% by weight.

For one specific way of carrying out the invention it is also possible to use resins which are specifically compatible in only one of the polymer blocks P(A), P(B), P(A/C), P(B/D). It is also possible, optionally, to add plasticizers, fillers (e.g. fibres (e.g. cellulose fibres, polyvinyl alcohol fibres), carbon black, zinc oxide, titanium dioxide, chalk, solid or hollow glass beads, microbeads made of other materials, silica, silicates), nucleators, expandants, compounding agents and/or ageing inhibitors, in the form for example of primary and secondary antioxidants or in the form of light stabilizers.

The internal strength (cohesion) of the PSA is preferably produced by the physical phase separation of the polymer blocks. The resultant physical crosslinking is typically thermoreversible. For irreversible crosslinking the PSAs may additionally be crosslinked chemically. For this purpose, the acrylic block copolymer PSAs which are used for the repulpable systems of the invention may optionally have added to them, in addition to components C and D, compatible crosslinker substances. Examples of suitable crosslinkers include metal chelates, polyfunctional isocyanates, polyfunctional amines or polyfunctional alcohols. Polyfunctional acrylates as well can be used with advantage as crosslinkers for actinic irradiation.

It may further be of advantage that the acidic groups of the carboxylic acid, of the alcohols, of the sulphonic acid or of the phosphoric acids are deprotonated with bases, resulting in agglomeration within the phases. In the simplest case, basic organic and inorganic compounds are used, such as NaOH, KOH, triethylamine, trimethylamine and dimethylamine, for example. It is, however, also possible to use polyfunctional bases, such as polyfunctional amines, for example.

For optional crosslinking with UV light, UV-absorbing photoinitiators are added to the polyacrylate block copolymers employed in the systems of the invention. Useful photoinitiators which can be used to great effect include benzoin ethers, such as benzoin methyl ether and benzoin isopropyl ether, substituted acetophenones, such as 2,2-diethoxyacetophenone (available as Irgacure 651® from Ciba Geigy®), 2,2-dimethoxy-2-phenyl-1-phenylethanone, dimethoxyhydroxyacetophenone, substituted a-ketols, such as 2-methoxy-2-hydroxypropiophenone, aromatic sulphonyl chlorides, such as 2-naphthylsulphonyl chloride, and photoactive oximes, such as 1-phenyl-1,2-propane-dione 2-(O-ethoxycarbonyl) oxime, for example.

The abovementioned photoinitiators and others which can be used, including those of the Norrish I or Norrish II type, may contain the following radicals: benzophenone, acetophenone, benzil, benzoin, hydroxyalkylphenone, phenyl cyclohexyl ketone, anthraquinone, trimethylbenzoylphosphine oxide, methylthiophenyl morpholinyl ketone, aminoketone, azobenzoin, thioxanthone, hexaarylbisimidazole, triazine or fluorenone, it being possible for each of these radicals additionally to be substituted by one or more halogen atoms and/or one or more alkyloxy groups and/or one or more amino groups or hydroxyl groups. A representative overview is given by Fouassier: "Photoinitiation, Photopolymerization and Photocuring: Fundamentals and Applications", Hanser-Verlag, Munich 1995. For further details, Carroy et al. in "Chemistry and Technology of UV and EB Formulation for Coatings, Inks and Paints", Oldring (ed.), 1994, SITA, London, can be consulted.

In principle it is also possible to irradiate the repulpable PSAs used in accordance with the invention with electron beams. Typical irradiation devices which may be employed include linear cathode systems, scanner systems and segmented cathode systems, in the case of electron beam accelerators. A detailed description of the state of the art, and the most important process parameters, can be found in Skelhorne, Electron Beam Processing, in Chemistry and Technology of UV and EB Formulation for Coatings, Inks and Paints, Vol. 1, 1991, SITA, London. The typical acceleration voltages are situated within the range between 50 kV and 500 kV, preferably between 80 kV and 300 kV. The scatter doses employed range between 5 and 150 kGy, in particular between 20 and 100 kGy.

Product Constructions of the PSA Sheet Materials

The PSA tape can be produced by coating the PSA composition described above onto one or more surfaces of a backing. Single-sided and double-sided PSA tapes are obtainable by this means. Where a repulpable PSA tape is reproduced, the backing ought likewise to be repulpable.

For use as a PSA tape it may likewise be necessary to line the PSA with a release liner. Commercially available examples include siliconized release papers.

It is also possible to apply the repulpable PSAs directly, without backing material. In this case, for example, the PSA is applied by spraying.

As well as special repulpable paper backings it may also be advantageous to apply the inventive PSAs to a conventional paper backing. Suitable examples include graphics papers or papers for offset printing.

Besides the application of the repulpable PSAs or PSA tapes for the papermaking process, the inventive PSAs can also be used for producing labels, PSA masking tapes, self-adhesive postage stamps, and also self-adhesive wall coverings or wall decorations.

EXAMPLES

Test Methods

A. Repulpability

The test was conducted in analogy to the Tappi test method UM 213 A for recyclable and water-dispersible pressure-sensitive adhesives. The test paper for the adhesive bond is "James River Pulp Testing Paper white 417-01-50" from Curtis Paper Division. The water hardness is 300 mg CaO/l water, corresponding to 30 dH [German hardness].

B. Static Shear Test

First of all the PSA is applied from solution to a siliconized release paper and then dried at 100° C. for 20 minutes. The coatweight is approximately 50 g/m$^2$. Then 13×20 mm strips are cut out and laminated onto two graphics paper strips (Turbo-Press T54G Feldmühle AG) with a width of 20 mm and a length of 100 mm. The long side of the rectangular PSA area were arranged along the paper strips at a distance of 3.5 mm from the corners. The splices were produced by exerting a pressure by means of a steel roller whose intrinsic weight was 2 kg. The steel roller was rolled 5 times over the splices at a speed of 0.2 m/s, after which the splice was conditioned for 48 h at 23° C. and 55% atmospheric humidity. Thereafter a shearing force was exerted on the splice in the longitudinal direction to the paper strips. With a shear weight of 10 N, the time taken for the PSA to shear off completely was measured, or the shear travel within a specific time is measured.

C. Gel Permeation Chromatography (GPC)

The average molecular weight $M_W$ and the polydispersity PD were determined by gel permeation chromatography. The eluent used was THF containing 0.1% by volume of trifluoroacetic acid. Measurement was made at 25° C. The precolumn used was PSS-SDV, 5µ, $10^3$ Å, ID 8.0 mm×50 mm. Separation was carried out using the columns PSS-SDV, 5µ, $10^3$ and also $10^5$ and $10^6$, each with ID 8.0 mm×300 mm. The sample concentration was 4 g/l and the flow rate 1.0 ml per minute. Measurement was made against polystyrene standards.

Production of Test Specimens

Preparation of a RAFT Regulator:

The regulator bis-2,2'-phenylethyl trithiocarbonate (formula VIII) was prepared starting from 2-phenylethyl bromide using carbon disulphide and sodium hydroxide in accordance with a specification from Synth. Comm., 1988, 18 (13), 1531. Yield 72%.

$^1$H-NMR (CDCl$_3$), δ: 7.20–7.40 ppm (m, 10 H); 3.81 ppm (m, 1 H); 3.71 ppm (m, 1 H); 1.59 ppm (d, 3 H); 1.53 ppm (d, 3 H).

Example 1

A 2 l reactor conventional for radical polymerization is charged under nitrogen with 40 g of acrylic acid, 40 g of 2-ethylhexyl acrylate, 1.2 g of bis-2,2'-phenylethyl trithiocarbonate regulator and 80 g of acetone. Heating is carried out to an internal temperature of 60° C. and the initial charge is initiated with 0.2 g of Vazo 67® (DuPont) in solution in 5 g of acetone. After a reaction time of 1.5 hours initiation is repeated with 0.2 g of Vazo 67® (DuPont) in solution in 5 g of acetone. After 5 and 7 hours of reaction the batch is diluted in each case with 50 g of acetone.

After a reaction time of 24 hours a sample is taken. Gel permeation chromatography (Test C) against polystyrene standards indicated $M_N$=30 100 g/mol and $M_W$=35 300 g/mol.

The polymerization is continued in the same reactor after a reaction time of 24 h. To the polymer are added 320 g of 2-ethylhexyl acrylate, 80 g of acetone and 20 g of isopropanol. After a reaction time of 24.75 hours initiation is repeated with 0.2 g of Vazo 67® (DuPont) in solution in 5 g of acetone. After 28.5 hours and 32 hours dilution is carried out with in each case 50 g of acetone. After 48 hours initiation is repeated with 0.2 g of Vazo 67® (DuPont) in solution in 5 g of acetone. After 55.5 hours 20 g of acetone are added and after 72 hours the reaction is terminated by cooling to room temperature.

Gel permeation chromatography (Test C) against polystyrene standards indicated $M_N$=41 900 g/mol and $M_W$=77 400 g/mol.

Example 2

A 2 l reactor conventional for radical polymerization is charged under nitrogen with 80 g of acrylic acid, 160 g of DMF and 0.8 g of bis-2,2'-phenylethyl trithiocarbonate regulator. Heating is carried out to an internal temperature of 60° C. and the batch is initiated with 0.2 g of Vazo 67®) (DuPont) in solution in 5 g of DMF. After a reaction time of 48 hours the reaction mixture is cooled to room temperature and the DMF solvent (dimethylformamide) is distilled off on a rotary evaporator. Gel permeation chromatography (Test C) against polystyrene standards indicated $M_N$=7 500 g/mol and $M_W$=15 200 g/mol.

The polymerization is continued in the same reactor after 24 h. To the polyacrylic acid are added 80 g of 2-ethylhexyl acrylate, 160 g of acetone and 40 g of ethanol. At an internal temperature of 60° C. initiation is carried out with 0.1 g of Vazo 67® (DuPont), in solution in 5 g of acetone. After 24 hours initiation is repeated with 0.1 g of Vazo 67® (DuPont), in solution in 5 g of acetone and after 32 h the batch is diluted with 50 g of acetone. After 48 h the reaction is terminated by cooling to room temperature.

Gel permeation chromatography (Test C) against polystyrene standards indicated $M_N$=54 700 g/mol and $M_W$=103 800 g/mol.

Example 3

A 2 L reactor conventional for radical polymerization is charged under nitrogen with 80 g of acrylic acid, 160 g of DMF and 0.8 g of bis-2,2'-phenylethyl trithiocarbonate regulator. Heating is carried out to an internal temperature of 60° C. and the batch is initiated with 0.2 g of Vazo 67® (DuPont) in solution in 5 g of DMF. After a reaction time of 48 hours the reaction mixture is cooled to room temperature and the DMF solvent (dimethylformamide) is distilled off on a rotary evaporator. Gel permeation chromatography (Test C) against polystyrene standards indicated $M_N$=7 500 g/mol and $M_W$=15 200 g/mol.

The polymerization is continued in the same reactor after 24 h. To the polyacrylic acid are added 60 g of 2-ethylhexyl acrylate, 20 g of acrylic acid, 160 g of acetone and 30 g of ethanol. At an internal temperature of 60° C. initiation is carried out with 0.1 g of Vazo 67® (DuPont), in solution in 5 g of acetone. After 24 hours initiation is repeated with 0.1 g of Vazo 67® (DuPont), in solution in 5 g of acetone and after 32 h the batch is diluted with 50 g of acetone. After 48 h the reaction is terminated by cooling to room temperature.

Gel permeation chromatography (Test C) against polystyrene standards indicated $M_n$=59 200 g/mol and $M_W$=110 300 g/mol.

Production of the PSA Material 50 g of Examples 1, 2 and 3 (based on the polymer fraction) were blended with in each case 115 g of ethoxylated liquid primary coconut oil amine. This plasticizer is based on a primary amine in which all of the hydrogen atoms have been substituted by ethoxylated side chains. The plasticizer contains approximately 15 ethoxy units per amino function and is available under the trade name Ethomeen C 25 from Akzo Nobel. 0.1 g of bisphenol A bisglycidyl ether is added to each blend and a clear solution is produced by adding water and acetone.

Results

The GPC measurements demonstrate that the polyacrylic acid prepared in the first step can be used to prepare, by reinitiation, block copolymers containing acrylic acid. The construction of the middle block in the second step further significantly raises the molecular weight—a clear indication of sequential polymerization.

The polymers prepared (Examples 1 to 3) were then blended in each case with a plasticizer and with a thermal crosslinker. Repulpability was tested by Test A and the internal strength by Test B. All of Examples 1 to 3 were flawlessly repulpable by Test A. The results of the static shear test are listed below:

Example 1: 200 min
Example 2: 800 min
Example 3: >5 000 min

We claim:

1. Repulpable pressure-sensitive adhesive comprising at least one polyacrylate-based block copolymer, wherein said polyacrylate block copolymer comprises a sequence of hard polymer blocks having a softening/glass transition temperature of not less than 20° C. and having at least one polar unit and of soft polymer blocks [P(A)] having a softening/glass transition temperature of not more than 0° C.

2. Repulpable pressure-sensitive adhesive according to claim 1, wherein the block copolymer has a triblock structure P(A)-P(B)-P(A) and/or P(B)-P(A)-P(B) where P(A) is a hard polymer block having a softening/glass transition temperature of not less than 20° C. and at least one polar unit and P(B) is a soft polymer block having a softening/glass transition temperature of not more than 0° C.

3. Repulpable pressure-sensitive adhesive according to claim 1, wherein the block copolymer comprises a sequence of hard polymer blocks [P(A)] having a softening/glass transition temperature of not less than 20° C. and having at least one polar unit and of soft polymer blocks [P(B)] having a softening/glass transition temperature of not more than 0° C. and the block copolymer in the polymer blocks P(A) and/or P(B) comprises at least one comonomer having at least one functional group which is inert in a free-radical polymerization reaction and which is able to promote a crosslinking reaction of the block copolymers and/or raises the softening/ glass transition temperature.

4. Repulpable pressure-sensitive adhesive according to claim 1, wherein the block copolymer has a P(A)-P(B/D)-P(A) structure, where P(B/D) represents a copolymer block of the monomers B and D and possesses a softening/glass transition temperature of from −80° C. to 0° C., component D possessing at least one functional group which is inert in a free-radical polymerization reaction and serves to increase the cohesion of the block copolymer;

P(A) represents a polymer block of the monomers A and possesses a softening/glass transition temperature of from 20° C. to 175° C. and bears at least one polar unit; and the polymer block P(A) is insoluble in the copolymer block P(B/D) and the polymer block P(A) and the copolymer block P(B/D) are immiscible.

5. Repulpable pressure-sensitive adhesive according to claim 4, wherein the fraction of the polymer blocks P(A) in the block copolymer is from 10 to 60% by weight.

6. Repulpable pressure-sensitive adhesive according to claim 5, wherein the fraction of component D in the copolymer block P(B/D) is from 0.5 to 30% by weight.

7. Repulpable pressure-sensitive adhesive according to claim 1, wherein the block copolymer has a P(B)-P(A)-P(B) or P(B/D)-P(A)-P(B/D) structure, where P(B) represents a polymer block of the monomers B and possesses a softening/glass transition temperature of not more than 0° C.;

P(B/D) represents a copolymer block of the monomers B and D and possesses a softening/glass transition temperature of not more than 0° C., component D possessing at least one functional group which is inert In a free-radical polymerization reaction and which serves to increase the cohesion of the block copolymer;

P(A) represents a polymer block of the monomers A and possesses a softening/glass transition temperature of not less than 20° C. and beam at least one polar unit; and the polymer block P(A) is insoluble in the polymer block P(B) or in the copolymer block P(B/D) and the polymer block P(B) and also the copolymer block P(B/D) and P(A) are immiscible.

8. Repulpable pressure-sensitive adhesive according to claim 7, wherein the fraction of the polymer blocks P(A) in the block copolymer is from 30 to 70% by weight.

9. Repulpable pressure-sensitive adhesive according to claim 7, wherein the fraction of component D in the copolymer block P(B/D) is from 0.5 to 30% by weight.

10. Repulpable pressure-sensitive adhesive according to claim 1, wherein the block copolymer has P(A/C)-P(B)-P(A/C) structure, where P(B) represents a polymer block of the monomers B and possesses a softening/glass transition temperature of from −80° C. to 0° C.;

P(A/C) represents a polymer of at least two monomers A and C and possesses a softening/glass transition temperature of from 20° C. to 175° C. component C being selected from the group of monomers which as homopolymers have a softening/glass transition temperature of greater than 80° C or are capable of UV crosslinking: and the polymer block P(B) is insoluble in the copolymer block P(A/C) and the polymer block P(B) and the copolymer block P(A/C) are immiscible.

11. Repulpable pressure-sensitive adhesive according to claim 10, wherein the fraction of the copolymer blocks P(A/C) in the block copolymer is from 30 to 65% by weight.

12. Repulpable pressure-sensitive adhesive according to claim 10, wherein the fraction of component C in the copolymer block P(A/C) is from 0.5 to 30% by weight.

13. Repulpable pressure-sensitive adhesive according to claim 1, wherein the block copolymer has a $[P(A)-P(B)]_nX$ structure or a $[P(A)-P(B)]_{X[P(B)]m}$ structure, where n is an integer from 3 to 12, m is an integer from 3 to 12 and X represents a polyfunctional branching region;

P(A) represents a polymer block of the monomers A and possesses a softening/glass transition temperature in the range from 20t to 175° C. and bears at least one polar unit; and P(B) represents a polymer block of the monomers B and has a softening/glass transition temperature in the range from −80° C. to 0° C.

14. Repulpable pressure-sensitive adhesive tape comprising a backing material, wherein at least one side of the backing material is provided with a pressure-sensitive adhesive according to any one of the preceding claims.

15. A method of splicing papers, which comprises splicing said papers with a repulpable pressure-sensitive adhesive tape of claim 14.

* * * * *